United States Patent
Lee et al.

(10) Patent No.: US 8,811,961 B2
(45) Date of Patent: Aug. 19, 2014

(54) METHOD AND APPARATUS FOR MTC IN A WIRELESS COMMUNICATION SYSTEM

(75) Inventors: Young Dae Lee, Anyang-si (KR); Seung June Yi, Anyang-si (KR); Sung Jun Park, Anyang-si (KR); Sung Hoon Jung, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/582,156

(22) PCT Filed: Mar. 11, 2011

(86) PCT No.: PCT/KR2011/001736
§ 371 (c)(1),
(2), (4) Date: Aug. 31, 2012

(87) PCT Pub. No.: WO2011/112051
PCT Pub. Date: Sep. 15, 2011

(65) Prior Publication Data
US 2012/0329485 A1 Dec. 27, 2012

Related U.S. Application Data

(60) Provisional application No. 61/313,099, filed on Mar. 11, 2010.

(51) Int. Cl.
*H04M 3/42* (2006.01)
*H04W 4/00* (2009.01)
*H04W 40/00* (2009.01)
*H04W 68/00* (2009.01)

(52) U.S. Cl.
USPC ........ 455/415; 455/426.2; 455/445; 455/458; 455/466; 455/509; 370/216; 370/312; 370/435; 370/466; 379/45; 379/67.1; 379/88.22; 379/201.01; 707/610; 709/201; 711/100; 715/808

(58) Field of Classification Search
CPC .... H04M 3/42042; H04M 1/57; H04M 1/575
USPC .......... 370/216, 312, 349, 466; 379/45, 67.1, 379/201.01; 455/415, 426.2, 435, 445, 461, 455/458, 466, 509, 561; 715/808; 711/100; 709/201; 707/206, 610
See application file for complete search history.

(56) References Cited

U.S. PATENT DOCUMENTS

| | | | | |
|---|---|---|---|---|
| 4,965,719 A | * | 10/1990 | Shoens et al. | 711/100 |
| 5,323,444 A | * | 6/1994 | Ertz et al. | 379/45 |
| 5,379,337 A | * | 1/1995 | Castillo et al. | 379/45 |
| 5,550,976 A | * | 8/1996 | Henderson et al. | 709/201 |
| 5,742,668 A | * | 4/1998 | Pepe et al. | 455/415 |
| 5,742,905 A | * | 4/1998 | Pepe et al. | 455/461 |
| 5,778,323 A | * | 7/1998 | Dorenbosch et al. | 455/561 |
| 5,813,007 A | * | 9/1998 | Nielsen | 1/1 |

(Continued)

FOREIGN PATENT DOCUMENTS

KR 10-2008-0030946 4/2008
KR 10-2009-0009918 1/2009

*Primary Examiner* — William D Cumming
(74) *Attorney, Agent, or Firm* — Lee, Hong, Degerman, Kang & Waimey

(57) ABSTRACT

Provided are a method and apparatus for machine-type communication (MTC) in a wireless communication system. An MTC device receives, from a base station, a notification message which notifies of the reception of an MTC message, and transmits a reception confirmation message indicating whether or not the MTC message is received.

9 Claims, 9 Drawing Sheets

(56) References Cited

U.S. PATENT DOCUMENTS

| | | | |
|---|---|---|---|
| 6,034,970 A * | 3/2000 | Levac et al. | 370/466 |
| 6,216,004 B1 | 4/2001 | Tiedemann, Jr. et al. | |
| 6,424,966 B1 * | 7/2002 | Meyerzon et al. | 707/610 |
| 6,430,269 B1 * | 8/2002 | Kanerva | 379/67.1 |
| 6,459,440 B1 * | 10/2002 | Monnes et al. | 715/808 |
| 6,567,397 B1 * | 5/2003 | Campana, Jr. et al. | 370/349 |
| 6,771,659 B1 * | 8/2004 | Parantainen et al. | 370/466 |
| 8,036,687 B2 * | 10/2011 | Lee | 455/466 |
| 8,271,010 B2 * | 9/2012 | Nakatsugawa | 455/509 |
| 2002/0061097 A1 * | 5/2002 | Kanerva | 379/201.01 |
| 2002/0087643 A1 * | 7/2002 | Parsons et al. | 709/206 |
| 2003/0134638 A1 * | 7/2003 | Sundar et al. | 455/435 |
| 2003/0185148 A1 * | 10/2003 | Shinomiya et al. | 370/216 |
| 2004/0023676 A1 * | 2/2004 | Lee | 455/466 |
| 2004/0125925 A1 * | 7/2004 | Marsot | 379/88.22 |
| 2005/0009515 A1 * | 1/2005 | Inoko | 455/426.2 |
| 2005/0090242 A1 * | 4/2005 | Kotzin et al. | 455/422.1 |
| 2006/0084442 A1 * | 4/2006 | Kotzin et al. | 455/445 |
| 2010/0137007 A1 * | 6/2010 | Kojima | 455/458 |
| 2010/0248768 A1 * | 9/2010 | Nakatsugawa | 455/509 |
| 2012/0329485 A1 * | 12/2012 | Lee et al. | 455/458 |
| 2013/0194998 A1 * | 8/2013 | Susitaival et al. | 370/312 |

* cited by examiner

METHOD AND APPARATUS FOR MTC IN A WIRELESS COMMUNICATION SYSTEM

CROSS-REFERENCE TO RELATED APPLICATIONS

This application is the National Stage filing under 35 U.S.C. 371 of International Application No. PCT/KR2011/001736, filed on Mar. 11, 2011, which claims the benefit of U.S. Provisional Application Ser. No. 61/313,099, filed on Mar. 11, 2010, the contents of which are all hereby incorporated by reference herein in their entirety.

TECHNICAL FIELD

The present invention relates to wireless communication and, more specifically, to a method and apparatus for Machine-Type Communication (MTC) in a wireless communication system.

BACKGROUND ART

Machine-Type Communication (MTC) is one type of data communication including one or more entities that do not require an interaction with a human being. That is, MTC refers to a concept in which machine apparatuses not a terminal that is used by a human being perform communication using the existing wireless communication network. A machine apparatus used in MTC may be called an MTC device, and the MTC device includes various devices, such as a vending machine and a machine for controlling the water level of a dam.

An MTC device has different characteristics from common terminals, and thus services optimized for MTC may be different from services optimized for human to human communication. MTC may be characterized in different market scenarios, data communication, small costs and efforts, a very large number of potential communication terminals, a wide service area, and low traffic per terminal, as compared with the present mobile network communication service.

It is expected that the number of MTC devices supported by one base station will be much greater than the number of terminals. There is a high probability that communications will be performed for a plurality of MTC devices at the same time according to common Machine to Machine (M2M) service characteristics.

Accordingly, there is a possibility that network resources will be insufficient, and there is a need for a scheme for handling a network signaling load for MTC devices efficiently.

DISCLOSURE

Technical Problem

The present invention provides a method and apparatus for Machine-Type Communication (MTC) in a wireless communication system.

Technical Solution

In an aspect, a communication method for Machine-Type Communication (MTC) in a wireless communication system is provided. The communication method includes receiving, by an MTC device, a notification message that informs a reception of an MTC message from a base station and transmitting, by the MTC device, a reception acknowledgement message regarding whether the MTC message has been received or not.

The MTC device may receive the notification message in a Radio Resource Control (RRC) idle state.

The method may further include starting an MTC timer when the notification message is received and the reception acknowledgement message may be transmitted when the MTC timer expires.

The method may further include stopping the MTC timer when the MTC message is received while the MTC timer is running.

the reception acknowledgement message may be an RRC connection request message or an RRC connection setup complete message which is used in RRC connection.

In another aspect, an apparatus for Machine-Type Communication (MTC) in a wireless communication system includes a radio frequency (RF) unit configured to transmit and receive radio signals, and a processor connected to the RF unit and configured to receive a notification message informing a reception of an MTC message from a base station and transmit a reception acknowledgement message regarding whether the MTC message has been received or not.

Advantageous Effects

Signaling overhead can be reduced because an MTC device does not need to start an RRC connection process individually in order to receive an MTC message.

MODE FOR INVENTION

Figure 1:
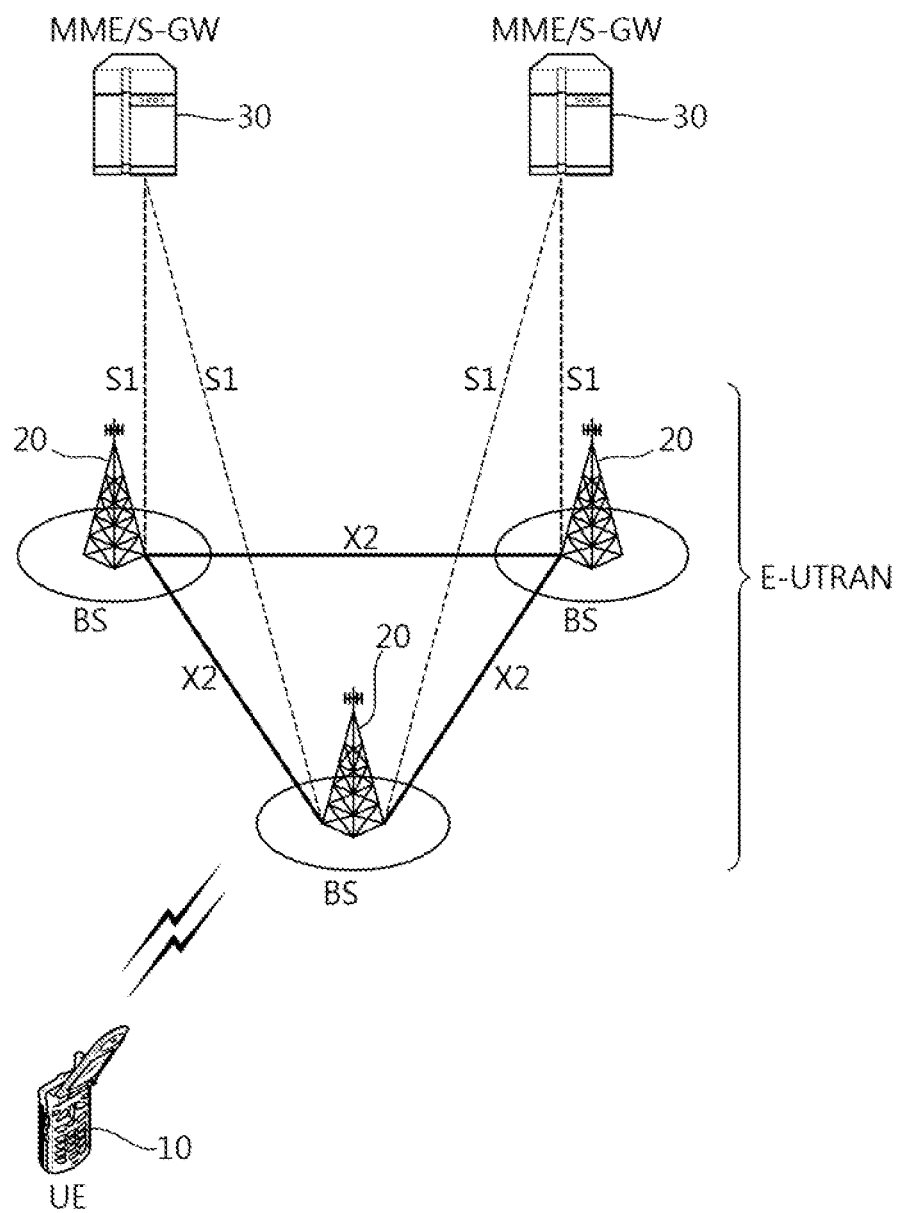
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to user equipment (UE) 10. The UE 10 may be fixed or mobile, and may be referred to as another terminology, such as a mobile station (MS), a user terminal (UT), a subscriber station (SS), a mobile terminal (MT), and a wireless device. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW).

The MME has access information of the UE or capability information of the UE, and such information is generally used for mobility management of the UE. The S-GW is a gateway having an E-UTRAN as an end point. The P-GW is a gateway having a PDN as an end point.

A radio interface between a UE and a BS is called as Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
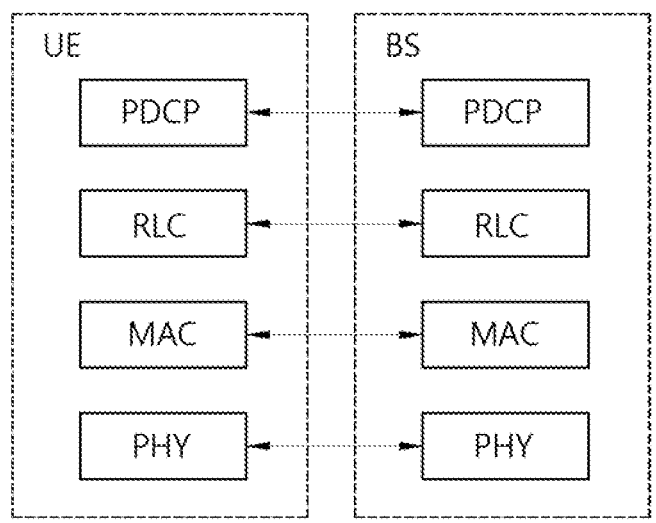
FIG. 2 is a block diagram of the structure of a radio protocol for a user plane.
Figure 3:
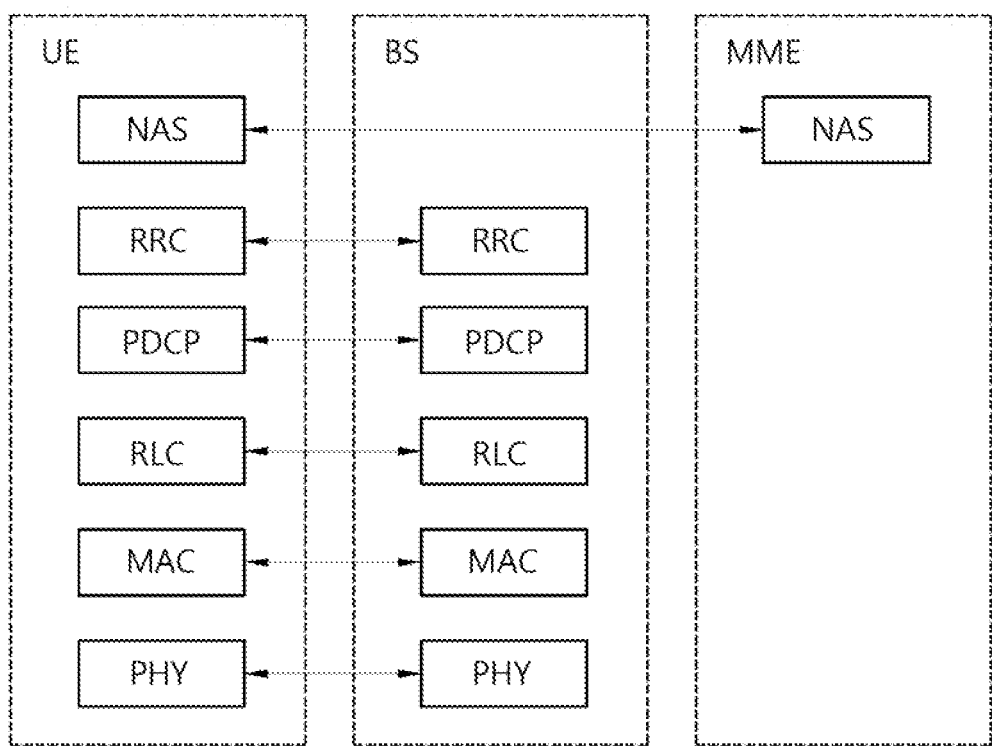
FIG. 3 is a block diagram showing the structure of a radio protocol for a control plane.

FIG. 2 is a block diagram of the structure of a radio protocol for a user plane. FIG. 3 is a block diagram showing the structure of a radio protocol for a control plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (or may be called as an RRC connected mode), and otherwise the UE is in an RRC idle state (or may be called as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Figure 4:
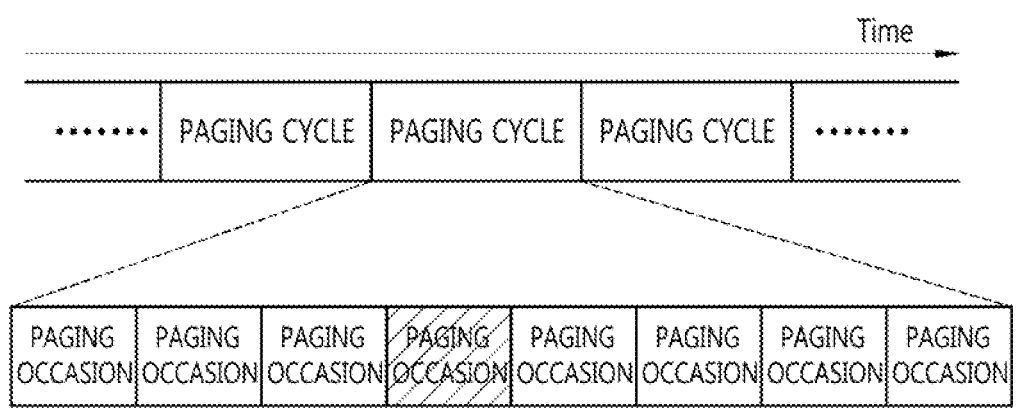
FIG. 4 shows the transmission of a paging message according to the prior art.

FIG. 4 shows the transmission of a paging message. A paging message is used to wake up corresponding UE when there is data to be transmitted to specific UE or there is a call that has reached the specific UE in a network.

First, a network determines whether UE is now placed in what location area and transmits a paging message through one cell that belongs to the location area where the corresponding UE is placed. The UE informs the network that the location area is changed whenever the location area is changed. A process of informing a change of the location area is called a location area update process.

When receiving the paging message, discontinuous reception (DRX) may be performed in order to reduce the power consumption of the UE. Several paging occasions are configured every time cycle called a paging cycle so that specific UE wakes up only in a specific call occasion and obtains the paging message. The UE does not receive a paging channel in time other than the paging occasions. The interval of one paging occasion may correspond to one TTI.

FIG. 4 shows that a paging cycle includes eight paging occasions and a fourth paging occasion has been allocated to UE. The UE wakes up in the fourth paging occasion and monitors whether a paging message is transmitted or not. The UE may enter sleep mode again in other paging occasions.

Figure 5:
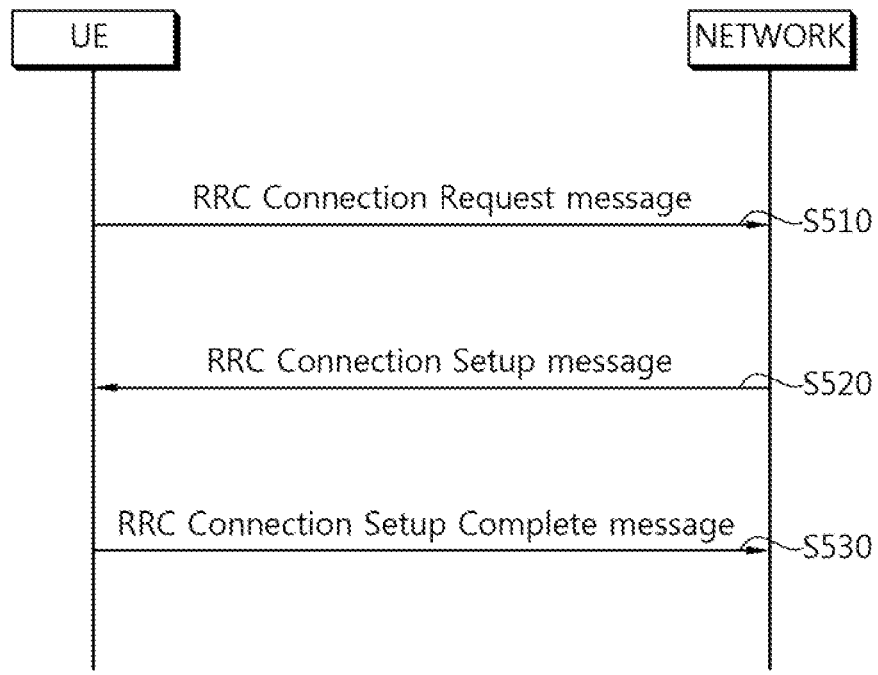
FIG. 5 is a flowchart illustrating a process of establishing RRC connection.

FIG. 5 is a flowchart illustrating a process of establishing RRC connection.

UE transmits an RRC connection request message, requesting RRC connection, to a network (S510). In response to the RRC connection request, the network transmits an RRC connection setup message (S520). After the RRC connection setup message is received, the UE enters RRC connection mode.

The UE transmits an RRC connection setup complete message sued to check whether RRC connection establishment has been successfully completed to the network (S530).

RRC connection reestablishment is performed like the RRC connection establishment. The RRC connection reestablishment is to reestablish RRC connection and is related to the restart of an SRB1 operation, the reactivation of security, and the configuration of a Primary Cell (PCell). The UE transmits an RRC connection reestablishment request message, requesting RRC connection reestablishment, to a network. In response to the RRC connection reestablishment request, the network transmits an RRC connection reestablishment message. In response to the RRC connection reestablishment, the UE transmits an RRC connection reestablishment complete message.

System information is described below.

System information includes essential information that UE must know in order to access a BS. Accordingly, the UE must have received all pieces of system information before accessing the BS and must always have the latest system information. Furthermore, the system information is information that must be known by all UEs within one cell, and a BS transmits the system information periodically.

In accordance with Paragraph 5.2.2 of 3GPP TS 36.331 V8.7.0 (2009 September) "Radio Resource Control (RRC); Protocol specification (Release 8)", system information is classified into a Master Information Block (MIB), a Scheduling Block (SB), and a System Information Block (SIB). The MIB makes UE know the physical construction, for example, the bandwidth of a corresponding cell. The SB informs information about the transmission of SIBs, for example, a transmission cycle. The SIB is a set of pieces of related system information. For example, what SIB includes only information about a neighbour cell, and what SIB includes only information about an uplink radio channel that is used by UE.

A BS may use a paging message in order to inform UE whether system information has been changed or not. The paging message includes a system information change indicator that informs whether system information has been changed or not.

A UE receives a paging message according to a paging cycle. If the paging message indicates that system information has been changed, the UE receives the system information.

Machine Type Communication (MTC) is described below.

MTC means that communication is performed between machines without the intervention of a human being. UE used in MTC is called an MTC device. MTC is also called a Machine to Machine (M2M) as another terminology.

Services provided through MTC are different from services in the existing communication performed by the intervention of a human being, and they include various categories of services, such as tracking, metering, payment, medical field services, and remote control. For service requirements for MTC characteristic, reference may be made to 3GPP TS 22.368 V1.1.1 (2009-11) "3rd Generation Partnership Project; Technical Specification Group Services and System Aspects; Service requirements for machine-type communications; Stage 1 (Release 10)".

Figure 6:
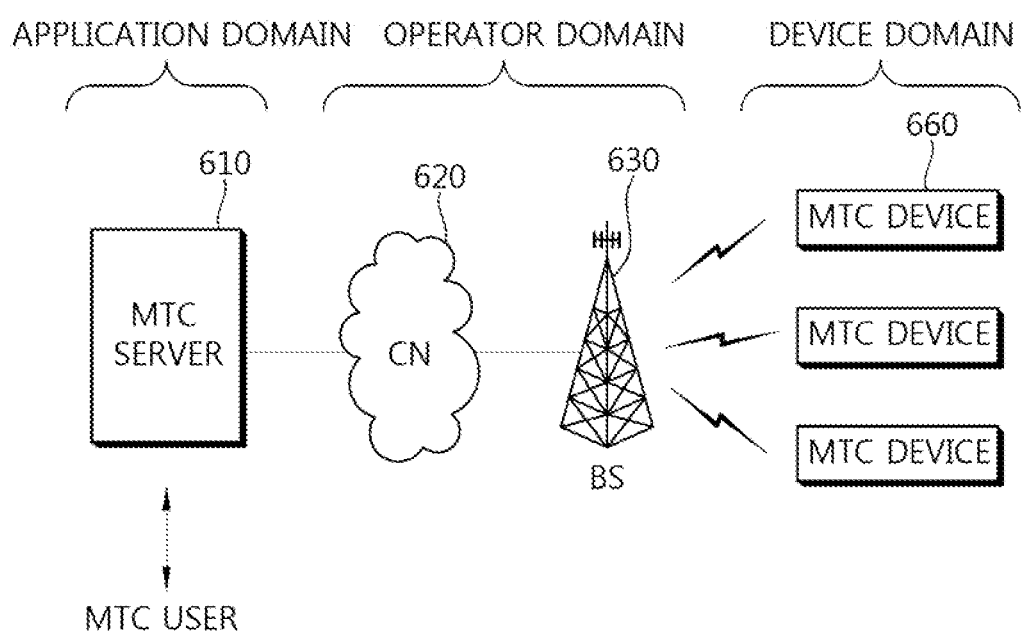
FIG. 6 shows an overall structure of MTC.

FIG. 6 shows an overall structure of MTC.

For MTC services, an MTC system may be classified into an application domain, an operator domain, and a device domain. The application domain includes an MTC user and an MTC server 610. The operator domain includes a Core Network (CN) 620 and a BS 630. The device domain includes one or more MTC devices 660.

The MTC devices 660 communicate with other MTC devices or the MTC server 610 over a wireless network. The MTC server 610 may provide the MTC user with services, such as metering, road information, and user electronic device adjustment, which are provided through the MTC devices 660.

In order to support the MTC services efficiently, characteristics, such as the low mobility, time tolerance, and small data transmission of an MTC device, may be taken into consideration. Furthermore, it may be assumed that numerous MTC devices exist within one cell.

Figure 7:
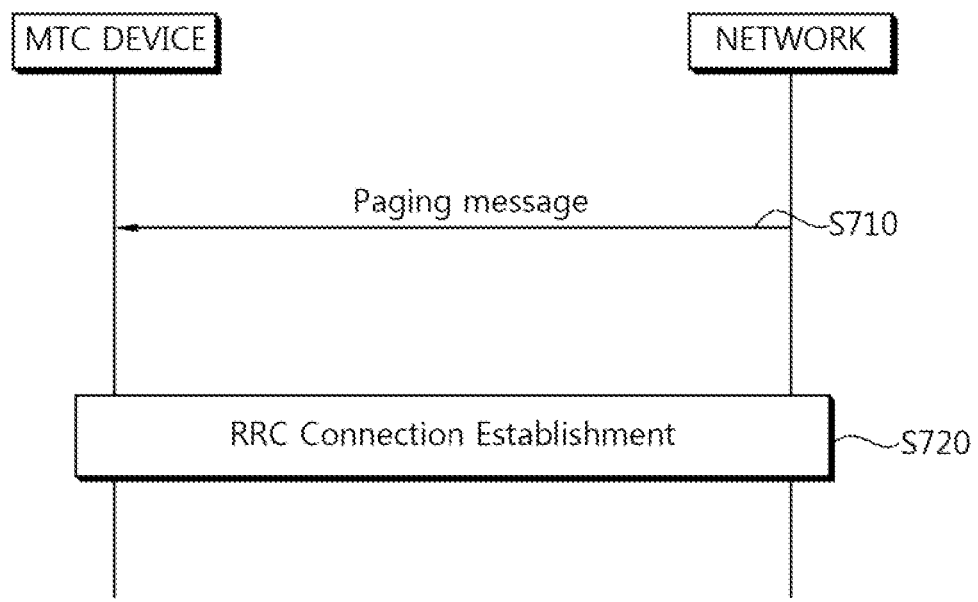
FIG. 7 shows the operation of a common MTC device.

FIG. 7 shows the operation of a common MTC device.

If there is information to be transmitted to an MTC device, a network transmits a paging message to the MTC device (S710). The MTC device that has received the paging message performs a process of setting up RRC connection with the network (S720).

Numerous MTC devices may exist within one cell. Accordingly, in order to provide communication service to a plurality of MTC devices, the plurality of MTC devices needs to set up RRC connection with a network. As shown in FIG. 5, in order to set up RRC connection, a plurality of message needs to be exchange. If a plurality of MTC devices attempts to set up RRC connection, excessive signaling overhead may occur.

In accordance with a proposed invention, an MTC device receives a paging message. If the paging message indicates the reception of a broadcast message for MTC, the MTC device receives the broadcast message for MTC through a common channel.

The paging cause included in the paging message may indicate the broadcast message for MTC.

The MTC device may operate in an RRC idle state.

The broadcast message for MTC may be transmitted as system information. The broadcast message for MTC may be transmitted as MTC-dedicated system information.

The common channel may be a broadcast control channel.

Figure 8:
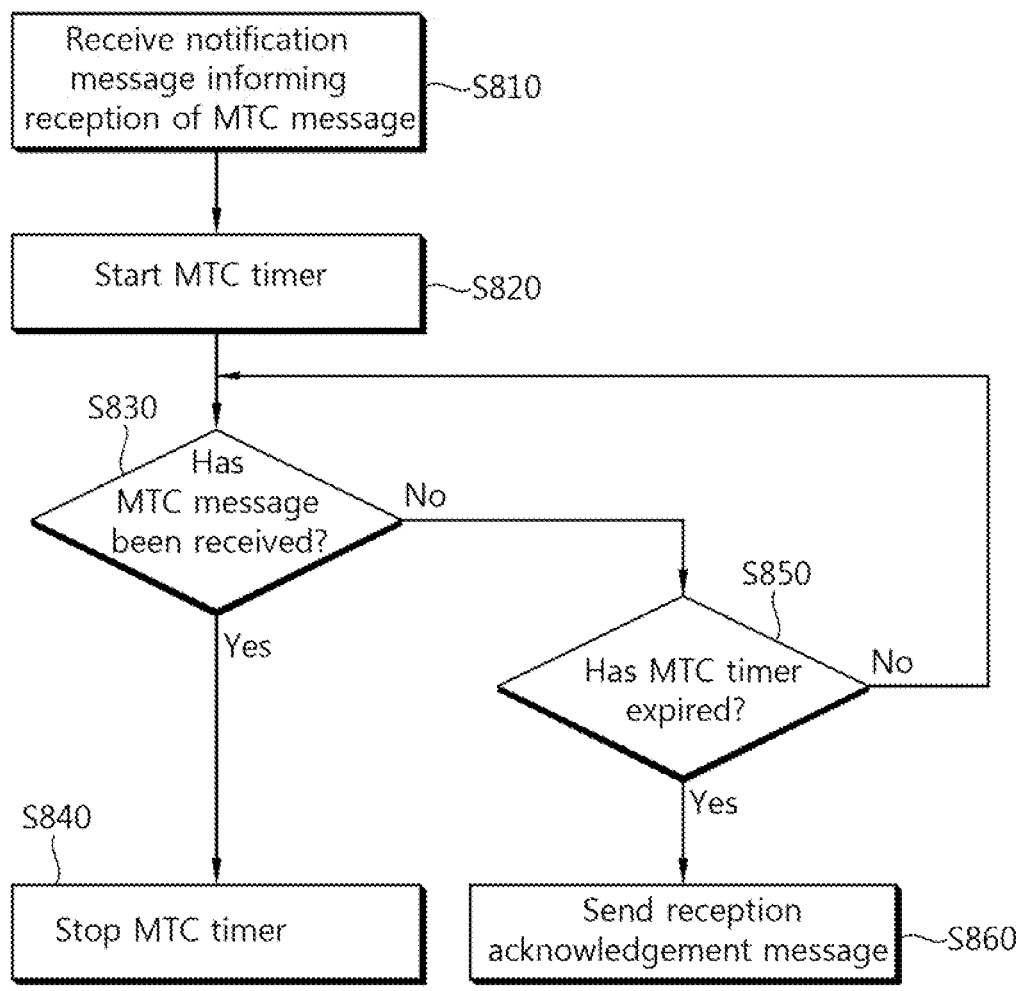
FIG. 8 is a flowchart illustrating an operation of an MTC device according to an embodiment of the present invention.

FIG. 8 is a flowchart illustrating an operation of an MTC device according to an embodiment of the present invention. This process may be performed by an MTC device or an MTC group including a plurality of MTC devices. This process may be performed by all MTC devices within a cell.

The MTC device receives a notification message that informs the reception of an MTC message (S810).

The notification message may be a paging message. The MTC device wakes up in a paging occasion from the paging cycle and monitors a control channel. The control channel may be a Physical Downlink Control Channel (PDCCH).

Cyclic Redundancy Check (CRC) of control information on the PDCCH has been masked by an identifier called a Paging-Radio Network Temporary Identifier (P-RNTI). The P-RNTI is an identifier indicating the reception of MTC service, and it may be a dedicated identifier that is allocated to a specific MTC device or a common identifier that is allocated to a plurality of MTC devices in common. The MTC device may demask the PDCCH to the P-RNTI in the paging occasion and receive the paging message of there is no CRC error.

The notification message may include at least one of the following.

(1) an identifier indicating an MTC device, an identifier indicating an MTC group to which the MTC device belongs, or an identifier indicating a specific message or a message group.

(2) a paging cause corresponding to an MTC message and/or MTC service (3) an indicator indicating the transmission of an MTC message and/or the request of MTC service (4) update information about an MTC message and/or MTC service (5) an indicator informing that there is a call to an MTC device The update information is used to distinguish repetitive transmission and new transmission from each other when a network transmits the same MTC message repeatedly. An MTC device may receive update information and determine whether a currently MTC message is identical with a previous MTC message or it includes updated information or not. If the MTC message is identical with the previous MTC message, the MTC device may not receive the current MTC message.

If an indicator informing that a call has occurred is received, an MTC device may start an RRC connection process.

When the P-RNTI is detected, the MTC device may receive an MTC message immediately. This means that a notification message corresponds to the detection of a PDCCH.

The notification message may be system information. For example, when the P-RNTI is detected, the MTC device receives the system information. The system information may be an MIB or an SIB. The system information may include at least one of the above-described (1)~(5).

When the notification message is received, the MTC device starts an MTC timer (S820). ABS may inform the MTC device of the value of the MTC timer in advance or the value of the MTC timer may be previously defined. The value of the MTC timer and/or whether the MTC timer will operate or not may be indicated by a notification message.

While the MTC timer operates, the MTC device attempts to receive an MTC message (S830). Information about the allocation of resources that is necessary to receive the MTC message may be included in the notification message. The MTC device may receive the MTC message through at least one of a BCCH, a CCCH, an MTCH, an MCCH, and a CTCH based on the resource allocation information included in the notification message.

The MTC message includes information about at least one MTC device, at least one MTC group, or MTC service for MTC devices within a cell. The MTC service may include tracking, measuring, payment, and remote control. The MTC message may be a message that is transmitted from an MTC user to an MTC device in order to provide MTC service.

Encryption information for reading the MTC message may be transmitted together with or separately from the MTC message. The MTC device first obtains encryption information. The MTC device may check the MTC message obtained using the encryption information and transfer the obtained MTC message to a higher layer of an RRC layer only when the MTC message is a pass.

Update information may be included in the MTC message. The RRC layer of an MTC device may compare the MTC message with a previously received MTC message based on the update information and transfer only updated information to a higher layer of the RRC layer.

The MTC message may be included in a Public Warning System (PWS) message. Here, a notification message may indicate the transmission of the PWS message.

When the MTC message is successfully received, the MTC timer is stopped (S840).

While the MTC timer operates, the MTC message may not be received and the MTC timer may expire (S850).

When the MTC timer expires, the transmission of a reception acknowledgement message may be triggered (S860). When the MTC timer expires, the MTC device may transmit the reception acknowledgement message.

The reception acknowledgement message may indicate whether part of or the entire MTC message has been received or not.

The reception acknowledgement message may be a retransmission request message including information that requests the retransmission of the MTC message.

The reception acknowledgement message may include ACK information indicating the successful reception of the MTC message or NACK information indicating the non-reception of the MTC message. If NACK information is included, the network may retransmit the MTC message.

The reception acknowledgement message may be an RRC connection request message or an RRC connection setup complete message which is used in RRC connection. This means that an MTC device attempts to enter from an RRC idle state to an RRC connection state if it does not receive an MTC message.

The reception acknowledgement message may include an indicator indicating the reception or non-reception of an MTC message. The reception acknowledgement message may include an identifier indicating an MTC device, an identifier indicating an MTC group to which the MTC device belongs, or an identifier indicating a specific message or a message group. The reception acknowledgement message may include a message Sequence Number (SN) or a packet SN for identifying an MTC message.

Signaling overhead can be reduced because an MTC device does not need to start an RRC connection process individually in order to receive an MTC message.

Figure 9:
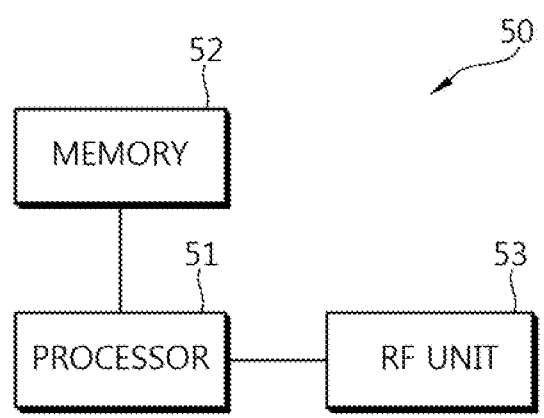
FIG. 9 is a block diagram showing an apparatus in which the embodiments of the present invention are embodied.

FIG. 9 is a block diagram showing an apparatus in which the embodiments of the present invention are embodied.

An MTC device 50 includes a processor 51, memory 52, and a Radio Frequency (RF) unit 53. The memory 52 is connected to the processor 51, and it stores various pieces of information for driving the processor 51. The RF unit 53 is connected to the processor 51, and it transmits and/or receives radio signals. The processor 51 may function as a timer and implements the proposed functions, processes and/or methods. In the embodiment of FIG. 5, the operation of the MTC device may be implemented by the processor 51.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

The invention claimed is:

1. A communication method for Machine-Type Communication (MTC) in a wireless communication system, the communication method comprising:
   receiving, by an MTC device, a paging-radio network temporary identifier (P-RNTI) that informs a reception of an MTC message from a base station;
   wherein the P-RNTI is received by monitoring a physical downlink control channel (PDCCH) periodically;
   receiving, by the MTC device, a paging message after the reception of the P-RNTI,
   wherein the paging message is received in a radio resource control (RRC) idle state, and
   wherein the paging message comprises at least one of
      an identifier indicating the MTC device,
      an identifier indicating an MTC group to which the MTC device belongs,
      a paging cause corresponding to the MTC message, or
      update information corresponding to the MTC message;
   starting, by the MTC device, an MTC timer when the paging message is received;
   attempting, by the MTC device, to receive the MTC message in accordance with the received paging message; and
   transmitting, by the MTC device before the MTC timer expires, a reception acknowledgement message regarding whether the MTC message has been received or not,
   wherein the reception acknowledgement message is an RRC connection request message or an RRC connection setup complete message which is used in an RRC connection.

2. The communication method of claim 1, wherein the paging message is received in a paging occasion within a paging cycle.

3. The communication method of claim 1, further comprising:
   stopping the MTC timer when the MTC message is received while the MTC timer is running.

4. The communication method of claim 3, wherein the MTC device receives the MTC message in the RRC idle state.

5. An apparatus for Machine-Type Communication (MTC) in a wireless communication system, the apparatus comprising:
   a radio frequency (RF) unit configured to transmit and receive radio signals; and
   a processor connected to the RF unit and configured to:
      receive a paging-radio network temporary identifier (P-RNTI) informing a reception of an MTC message from a base station;
      wherein the P-RNTI is received by monitoring a physical downlink control channel (PDCCH) periodically;
      receive a paging message after the reception of the P-RNTI, wherein the paging message is received in a radio resource control (RRC) idle state, and wherein the paging message comprises at least one of an identifier indicating the MTC device,
an identifier indicating an MTC group to which the MTC device belongs,
a paging cause corresponding to the MTC message, or update information corresponding to the MTC message;

start an MTC timer when the paging message is received;

attempt to receive the MTC message in accordance with the received paging message; and transmit, before the MTC timer expires, a reception acknowledgement message regarding whether the MTC message has been received or not, wherein the reception acknowledgement message is an RRC connection request message or an RRC connection setup complete message which is used in an RRC connection.

6. The apparatus of claim 5, wherein the paging message is received in a paging occasion within a paging cycle.

7. The apparatus of claim 5, wherein the processor is configured to stop the MTC timer when the MTC message is received while the MTC timer is running.

8. The method of claim 1, wherein the paging message comprises each of:
the identifier indicating the MTC device,
the identifier indicating an MTC group to which the MTC device belongs,
the paging cause corresponding to the MTC message, and
the update information corresponding to the MTC message.

9. The apparatus of claim 5, wherein the paging message comprises each of:
the identifier indicating the MTC device,
the identifier indicating an MTC group to which the MTC device belongs,
the paging cause corresponding to the MTC message, and
the update information corresponding to the MTC message.

* * * * *